United States Patent [19]
Powell et al.

[11] Patent Number: 5,404,380
[45] Date of Patent: Apr. 4, 1995

[54] DESYNCHRONIZER FOR ADJUSTING THE READ DATA RATE OF PAYLOAD DATA RECEIVED OVER A DIGITAL COMMUNICATION NETWORK TRANSMITTING PAYLOAD DATA WITHIN FRAMES

[75] Inventors: William E. Powell, Raleigh; William B. Weeber, Apex, both of N.C.

[73] Assignee: Alcatel Network Systems, Inc., Richardson, Tex.

[21] Appl. No.: 935,020

[22] Filed: Aug. 25, 1992

[51] Int. Cl.$^6$ .............................................. H04L 7/04
[52] U.S. Cl. ..................................... 375/363; 375/371; 370/102
[58] Field of Search ................. 375/118, 112; 370/102, 370/105.3

[56] References Cited

U.S. PATENT DOCUMENTS

| | | | |
|---|---|---|---|
| 3,931,473 | 1/1976 | Ferris, Jr. | 370/102 |
| 4,716,575 | 12/1987 | Douros et al. | 375/118 |
| 4,791,652 | 12/1988 | McEachern et al. | 375/112 |
| 4,811,340 | 2/1989 | McEachern et al. | 370/102 |
| 4,996,698 | 2/1991 | Nelson . | |
| 5,052,025 | 9/1991 | Duff et al. . | |
| 5,146,477 | 9/1992 | Cantoni et al. | 370/102 |
| 5,157,655 | 10/1992 | Hamlin, Jr. et al. | 370/102 |
| 5,200,982 | 4/1993 | Weeber | 375/118 |
| 5,297,180 | 3/1994 | Upp et al. | 375/118 |

OTHER PUBLICATIONS

T1X1 KB91-04–Letter Ballot for TI.101—"Synchronization Interface Standard", T1X1.3.
T1X1.6/90-009R2, New Section 7 for ANSI T1.105a, T1X1.2/.6.
T1X1.6/89-047—":SONET Jitter Measurement Criteria," AT&T.
T1X1.6/89-057—"Pointer Simulation Parameters," NT1.
T1X1.3/90-031—"Proposal for Short-Term Stability Specification of Sonet Timing Reference Signals," Bellcore.
T1X1.3/90-041—"Short Term Stability Specification of Timing Reference Signals at the Input to SONET NE's," PacBell.
T1X1/90-029—"A Technical Report on the Effects of SONET on Jitter, Wander, and Synchronization," T1X1.6.
T1X1.6/90-005 "STS-land OC-N Jitter Proposal," Alcatel.
T.105-1991 "Digital Hierarcy-Optical Interface Rates and Formats Specification (SONET)", Section 7 Synchronization.
T1X1.6/88-028—"Analysis of Jitter & Wander Associated with Pointer Adjustments," British Telecom.
T1X1.6/88-029 "A Possible Design for a Desynchronizer Accommodating Pointer Adjustments," British Telecom.
T1X1.6/89-029 "Results of Simulations of a Possible Desynchronizer Design," British Telecom.

(List continued on next page.)

*Primary Examiner*—Stephen Chin
*Assistant Examiner*—Timothy J. May
*Attorney, Agent, or Firm*—Ware, Fressola, Van Der Sluys & Adolphson

[57] ABSTRACT

A desynchronizer for processing pointer movements and stuff bit information associated with payload data transmitted within a synchronous digital communication network. The desynchronizer includes a payload extractor (58) for removing payload data and storing it in an elastic store (32). The extractor also removes the pointer and stuff bit information which is passed through a digital low pass bit leaking module (36). The difference between the write and read addresses of the elastic store is determined (modules 48 and 50) and algebraically combined with the output of the bit leaking module (36) so as to provide the necessary data for adjusting the instantaneous frequency of a variable controlled oscillator (44) that generates the timing base for the read clock for reading the payload from the elastic store in a manner that minimizes jitter.

24 Claims, 6 Drawing Sheets

OTHER PUBLICATIONS

T1X1.6/88-026 "A Synchronous Desynchronizer." Bellcore Signals, Bellcore.

T1X1.6/88-041 "Pointer Spreading Desynchronizer," Northern Telecom.

T1X1.3/92-071 "Jitter Accumulation Results in SONET Islands for Milli-Hertz NE Clock Bandwidths," Alcatel.

T1X1.3/92-072 "DS3 Payload Output Jitter Proposal," Alcatel.

T1X1.3/92-017 "Additional SONET Islands Jitter Simulation Results," Alcatel.

T1X1.3/92-006 "Initial Draft of SONET Jitter Standard," Tellabs.

T1 LB280 "A Technical Report on the Effects of SONET on Payload Output Jitter," T1X1.3.

"Design and Performance Verification of a SONET-TO-DS3 Desynchronizer,", Hamlin, Jr., TransSwitch Corp. Shelton, Conn., published before Feb. 25, 1992.

DESYNCHRONIZER FOR ADJUSTING THE READ DATA RATE OF PAYLOAD DATA RECEIVED OVER A DIGITAL COMMUNICATION NETWORK TRANSMITTING PAYLOAD DATA WITHIN FRAMES

FIELD OF THE INVENTION

The present invention is directed to synchronous digital communication system, and specifically desynchronizers used in such systems.

BACKGROUND OF THE INVENTION

The present invention is directed to a desynchronizer which alleviates the need for very low bandwidth analog phase lock loops (PLL's) to smooth phase jumps caused by pointer changes on a DS3 signal mapped into a SONET STS-1 payload. A similar desynchronizer can be built using purely analog phase lock loop technology. Another form of a desynchronizer can be designed to extract a DS3 payload from a SONET STS-1 payload which leaks the 8 unit interval (UI) pointer adjustment one bit at a time using fixed leaking digital techniques. The shortcomings of an analog only phase lock loop is that very low analog loop bandwidths are required to reduce the 8 UI phase jump caused by a SONET STS-1 pointer adjustment to levels low enough to meet output payload jitter specifications. Bandwidths in the 1 Hz region are required to reduce jitter content of the output phase transition to levels approximately equal to 1 UI, with lower jitter levels more desirable (but requiring lower bandwidths). Bandwidths this low require extremely large time constants and large filter component values for resistors and capacitors. In addition, they are slow to lock, thereby causing large time delays after transients before the DS3 channel is usable for data transmission again.

Simple fixed bit leakout desynchronizers are adequate to filter waiting time and mapping jitter. There is a digital adjunct circuit which can hide low occurrence "transient" effects, such as pointer adjustments, from the high bandwidth analog phase lock loop. If these transients are not hidden from the high bandwidth phase lock loop, jitter approaching 7 UI pp occurs from a single STS-1 pointer adjustment (an 8 UI step at the STS-1 rate produces a time gap of 8×19.3 ns=154 ns, or approximately 7 UI at the DS-3 rate).

While this type of desynchronizer hides the bulk of the pointer movement from the high bandwidth phase lock loop, it equalizes itself by leaking out the original pointer adjustment, one bit at a time into the high bandwidth phase lock loop. This equalization is necessary or the desynchronizer's elastic store would eventually overflow. As each bit is leaked out, usually as fast as possible without exceeding the overall payload jitter specification, jitter from 0.7 to 1.5 UI pp is generated by phase transitions in the output signal. These relatively high levels of jitter have been shown to cause problems in cascaded islands of SONET networks.

The present invention overcomes the above-mentioned difficulties by hiding the pointer adjustments through use of digital filtering techniques to gradually leakout the pointer adjustment. The magnitude of the jitter can be reduced to any arbitrarily low level by adjusting the digital filter's time constant and thus its bandwidth, and by increasing the numerical resolution in the digital filter and supporting digital circuitry.

Thus the present invention has the same net effect as an analog only phase lock loop, except that very low analog phase lock loop bandwidths are not required. The embodiment of the present invention uses a low bandwidth digital filter, a digital subtractor, a digital to analog function output stage and is coupled to a conventional high bandwidth analog phase lock loop.

The present invention is directed to a desynchronizer for use in a digital communication network wherein an asynchronous rate payload is mapped into a synchronous payload such as that associated with the Synchronous Optical Network (SONET) or the European equivalent thereto, SDH. As defined more fully in *American National Standard for Telecommunications,* ANSI T1.105-1991, *Digital Hierarchy-Optical Interface Rates and Format Specifications* and as also explained in *Digital Telephony,* Second Edition, John Bellamy, Wiley Series in Telecommunications, pointer movements of the synchronous payload envelope associated with a SONET network result from transmission of synchronous data from one network element to another. Such pointer movements in an overall telecommunications network can be modeled as shown in FIG. 1. This model represents a multi-node SONET network in which a DS3 payload is mapped into a SONET synchronous payload envelope at node 0. Nodes 1 to N-1 represent intermediate add/drop multiplexers (ADM's) containing pointer processors. These intermediate nodes each remap the original synchronous payload envelope (SPE) into a SONET frame rate determined by the local node clock (represented by rates f(1) to f(N-1)). Each of these local node clocks has a phase wander known as time interval error (TIE) relative to a stable (or traceable) clock. Thus, random pointer movement occurs on the SPE by the time it arrives at the desynchronizer (node N). A full discussion of network timing performance measurements is presented in Section 7.3.7 of *Digital Telephony,* Second Edition.

Pointer movements cannot be released immediately at the DS3 output, but rather must be stored in the desynchronizer elastic store and from there gradually leaked out. Pointer arrival statistics are important for elastic store sizing and desynchronizer architecture. Studies have been done in T1X1.6 on pointer statistics assuming TIE levels as set forth in Reference 1 (see Table 1). References 2 and 3 show typical statistical pointer arrivals assuming 2 to 6 byte +/− pointer adjustment thresholds in intermediate pointer processors. These thresholds are in addition to the required minimum of three bytes needed to accommodate the offset between input and output Section plus Line overhead bytes (see ANSI T1.105-1991). Assuming the TIE levels set forth in reference 0, a desynchronizer needs to accommodate four to five pointer arrivals within a one second period which is denoted as the granularity of simulation.

TABLE 1

| REFERENCES | | |
|---|---|---|
| 0. | T1X1 LB91-04 | Letter Ballot for T1.101 - "Synchronization Interface Standard", T1X1.3. |
| 1. | T1X1.6/90-009R2, | New Section 7 for ANSI T1.105a, T1X1.3/.6 |
| 2. | T1X1.6/89-047 | "SONET Jitter Measurement Criteria," AT&T |
| 3. | T1X1.6/89-057 | "Pointer Simulation Parameters," NT1. |
| 4. | T1X1.3/90-031 | "Proposal for Short-Term Stability Specification of SONET Timing Reference Signals," Bellcore |
| 5. | T1X1.3/90-041 | "Short Term Stability Specification of |

TABLE 1-continued

REFERENCES

|   |   |   |
|---|---|---|
|   |   | Timing Reference Signals at the Input to SONET NE's," PacBell |
|   | T1X1-LB90-01 | "A Technical Report on the Effects of SONET on Payload Output Jitter," T1X1.6 |
| 8. | T1X1.6/90-005 | "STS-1 and OC-N Jitter Proposal," Alcatel |
| 9. | T1.105-1991 | "Digital Hierarchy - Optical Interface Rates and Formats Specification (SONET), Section 7 Synchronization |
| 10. | T1X1.6/88-028 | "Analysis of Jitter & Wander Associated with Pointer Adjustments," British Telecom. |
| 11. | T1X1.6/88-029 | "A Possible Design for a Desynchronizer Accommodating Pointer Adjustments," British Telecom. |
| 12. | T1X1.6/89-029 | "Results of Simulations of a Possible Desynchronizer Design," British Telecom. |
| 13. | T1X1.6/88-026 | "A Synchronous Desynchronizer." Bellcore Signals," Bellcore. |
| 14. | T1X1.6/88-041 | "Pointer Spreading Desynchronizer," Northern Telecom. |
| (14a) | T1X1.3/92-071 | "Jitter Accumulation Results in SONET Islands for Milli-Hertz NE Clock Bandwidths," Alcatel. |
| (14b) | T1X1.3/92-072 | "DS3 Payload Output Finer Proposal," Alcatel. |
| (14c) | T1X1.3/92-017 | "Additional SONET Islands Jitter Simulation Results," Alcatel. |
| (14d) | T1X1.3/92-006 | "Initial Draft of SONET Jitter Standard," Tellabs. |
| 15. | T1 LB280 | "A Technical Report on the Effects of SONET on Payload Output Jitter," T1X1.3 |
| 16. |   | "Design and Performance Verification of a SONET-TO-DS3 Desynchronizer", Hamlin, Jr., TranSwitch Corp., Shelton, Connecticut, published before February 25, 1992. |
| 17. |   | U.S. Pat. No. 4,996,698 - Nelson - February 26, 1991 |
| 18. |   | U.S. Pat. No. 5,052,025 - Duff et al - September 24, 1991 |

The present desynchronizer overcomes the above-mentioned difficulties by a desynchronizer architecture based on linear models which can gracefully degrade in performance if normal thresholds are exceeded.

SUMMARY OF THE INVENTION

In particular, the present invention incorporates a bit leaking phase lock loop (PLL) which acts as a digital filter. Pointer movements and asynchronous stuff bit rate information are stored in the digital filter and are "leaked out" with a 1.6 second time constant. A pointer movement causes a shift in the write minus read (W−R) addresses of the 64 byte elastic store, which also appears at a subtractor module.

Such a pointer movement is detected and stored in a bit leaking loop register. It is then subtracted from the elastic store W−R address shift and is effectively hidden from the output digital to analog (D/A) function blocks and the high speed phase lock loop. The high speed phase lock loop is designed to have an 80 Hz bandwidth with a resultant time constant of 2 milliseconds.

The normal operating range in the elastic store can accommodate about +/− 17 pointer movements before a first set of thresholds are exceeded, which changes the bit leaking loop bandwidth to 1 Hz. Operation here exceeds the DS3 jitter specification by two to three times but does not generally cause data loss anywhere within the entire DS3 link.

If movement in the elastic store continues to a second set of thresholds, all pointer inputs to the bit leaking block are disabled and the asynchronous stuff bit rate is set to the nominal 3 bits per frame rate. This procedure causes rapid movement back to the center of the store with the 2 millisecond time constant of the high speed PLL. The DS3 jitter specification in such a situation is exceeded as the 8 unit interval (UI) pointer movements or synchronization transients on the asynchronous stuff bit will only be filtered with the 2 millisecond time constant PLL. Data loss in such a situation generally does not occur within the desynchronizer overall circuit but could occur in connected DS3 equipment, depending on the loop bandwidth and the elastic store size.

If movement continues to a third set of thresholds, an overflow condition is declared. In this situation, the elastic store W−R address is reset to 32 (the half full position) and the bit leaking loop registers are cleared. The threshold comparators are also reset and the overflow is reported to associated software. In such a situation, data is lost.

Thus the present invention achieves a number of advantages over prior art devices, including elimination of low bandwidth analog PLL's and greatly reduced settling time after transients, such that this settling time is on the order of the settling time associated with the high bandwidth phase lock loop. In addition, payload jitter can be reduced to very low levels and is limited only by the digital resolution and accuracy of the system. This effectively results in payload jitter on the asynchronous signal which is a small fraction of a bit.

The complex components forming the digital filter of the present invention can be implemented on an application specific integrated circuit (ASIC). Such a system is preferable over simpler, less robust and poorer performing fixed bit leakout desynchronizers.

It is therefore a principal object of the present invention to provide a desynchronizer for desynchronizing digital communication formats by use of digital filtering techniques that gradually leak out pointer adjustments for communications between nodes associated with a digital communication network.

A further object of the present invention is to provide a desynchronizer wherein the magnitude of the jitter can be reduced to any arbitrarily low level by adjusting the digital filter's time constant and by increasing the numerical resolution of the digital filter and supporting digital circuitry.

A still further object of the present invention is to provide a desynchronizer which eliminates the need for low bandwidth analog phase lock loops.

Another object of the present invention is to provide a desynchronizer wherein the settling time after transients is greatly reduced.

A further object of the present invention is to provide desynchronizer, wherein payload jitter can be reduced to very low levels limited by the digital resolution and inaccuracy of the digital filter.

Another object of the present invention is to provide a desynchronizer wherein at least complex portions of its digital filter can be implemented using an application specific integrated circuit so as to provide better performance over simpler but less robust fixed bit-leakout desynchronizers.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in conjunction with the accompanying drawings in which.

BEST MODE FOR CARRYING OUT THE INVENTION

Figure 1:
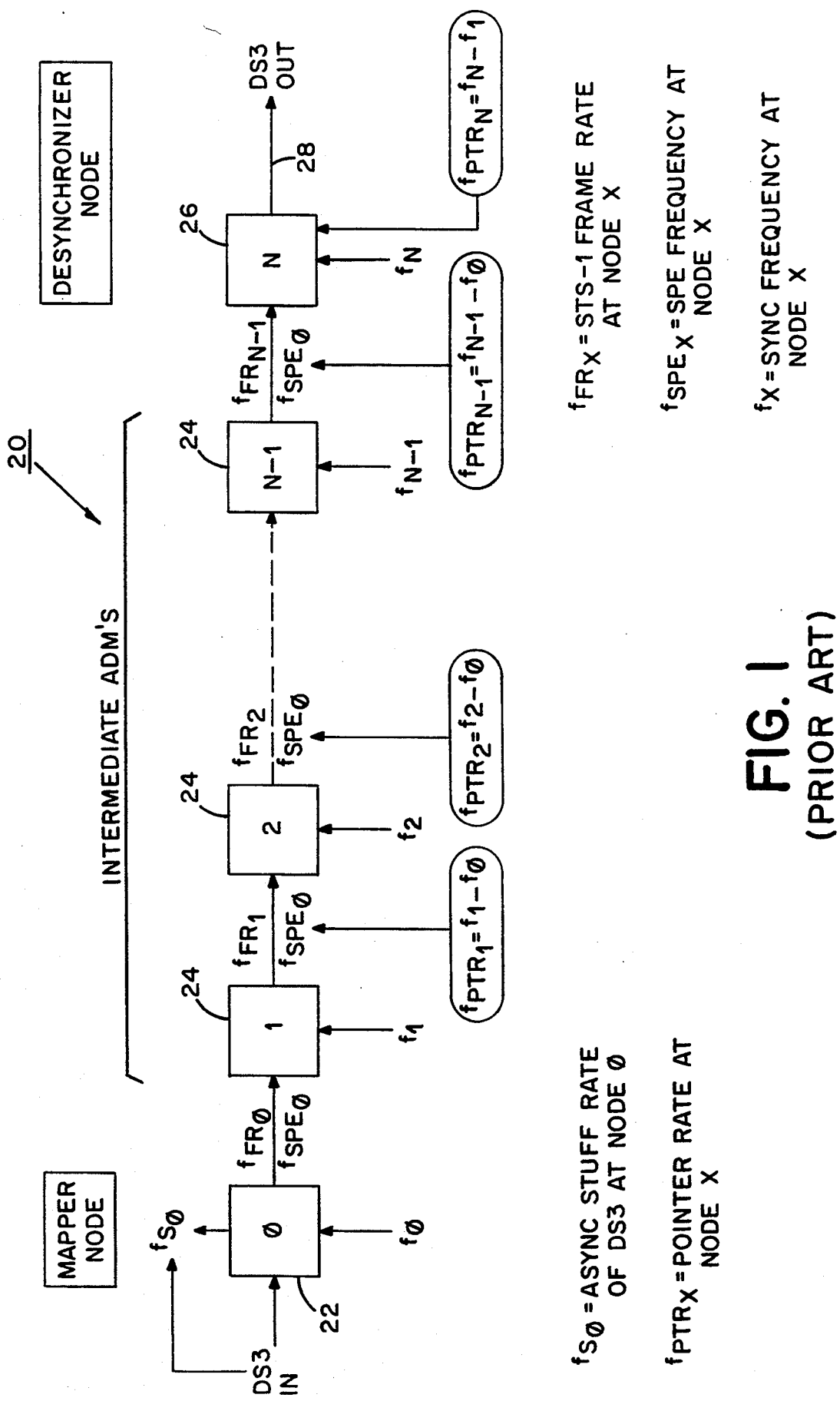
FIG. 1 is an overall block diagram of a plurality of network elements according to the prior art, forming a digital communication network, illustrating the synchronization and pointer movements for data flowing through the system.

The typical digital communication network is shown in FIG. 1. The overall network 20 represents a multi-node SONET network in which a DS3 payload is mapped into a SONET synchronous payload envelope (SPE) at node 0 (reference element 22). Nodes 1 to N-1 (reference element 24) represents intermediate add-/drop multiplexers (ADM's) containing pointer processors. These intermediate nodes remap the original SPE into a SONET frame rate determined by the local node clock as represented by rates f(1) to f(N-1). Each of these local node clocks may have phase wander known in the art as Time Interval Error (TIE) relative to a stable (or traceable) clock. Thus, random pointer movement occurs on the SPE by the time it arrives at node N as represented by desynchronizer 26.

Other causes of pointer movement are synchronization faults at any of the node reference clocks f(0) to f(N). If the fault occurs at node 0, there is a permanent offset between the SPE rate synchronized to clock f(0) and the frame rates at nodes 1 to N. This synchronization fault creates an off frequency SPE and also is mapped directly to a change in the asynchronous stuff bit rate at node 0. If the synchronous fault occurs at the last node, node N, there is a difference frequency between the SPE and the local node clock rate f(N) at node N's pointer processor.

If the synchronization fault occurs at an intermediate node such as node M where (M<N), then at node M, the correct rate is SPE minus rate f(0) is mapped into an incorrect frame rate, f(M). At the next node, M+1, the SPE is extracted with rate f(0) and is mapped into a frame having a rate of f(M+1) which is still synchronized. Thus pointer movement is arrested. Pointer movement leaving any node depends only on the difference on the SPE rate, f(0), and the local node clock rate. This result is true for synchronization faults and large phase movement at nodes. There may still be random pointer movements due to clock wander as well as the size of intermediate pointer processors at nodes 1 through N.

Pointer movement cannot be released immediately at the DS3 output 28, but rather must be stored in the desynchronizer elastic store and gradually transferred out of the store. This function generally referred to as "leaking out" the pointer movement. Pointer arrival statistics are important for elastic store sizing and desynchronizer architecture. The present invention provides a desynchronizer which is able to accommodate multiple pointer arrivals which are closely spaced while meeting TIE requirements such as those specified by reference [0].

Figure 2A:
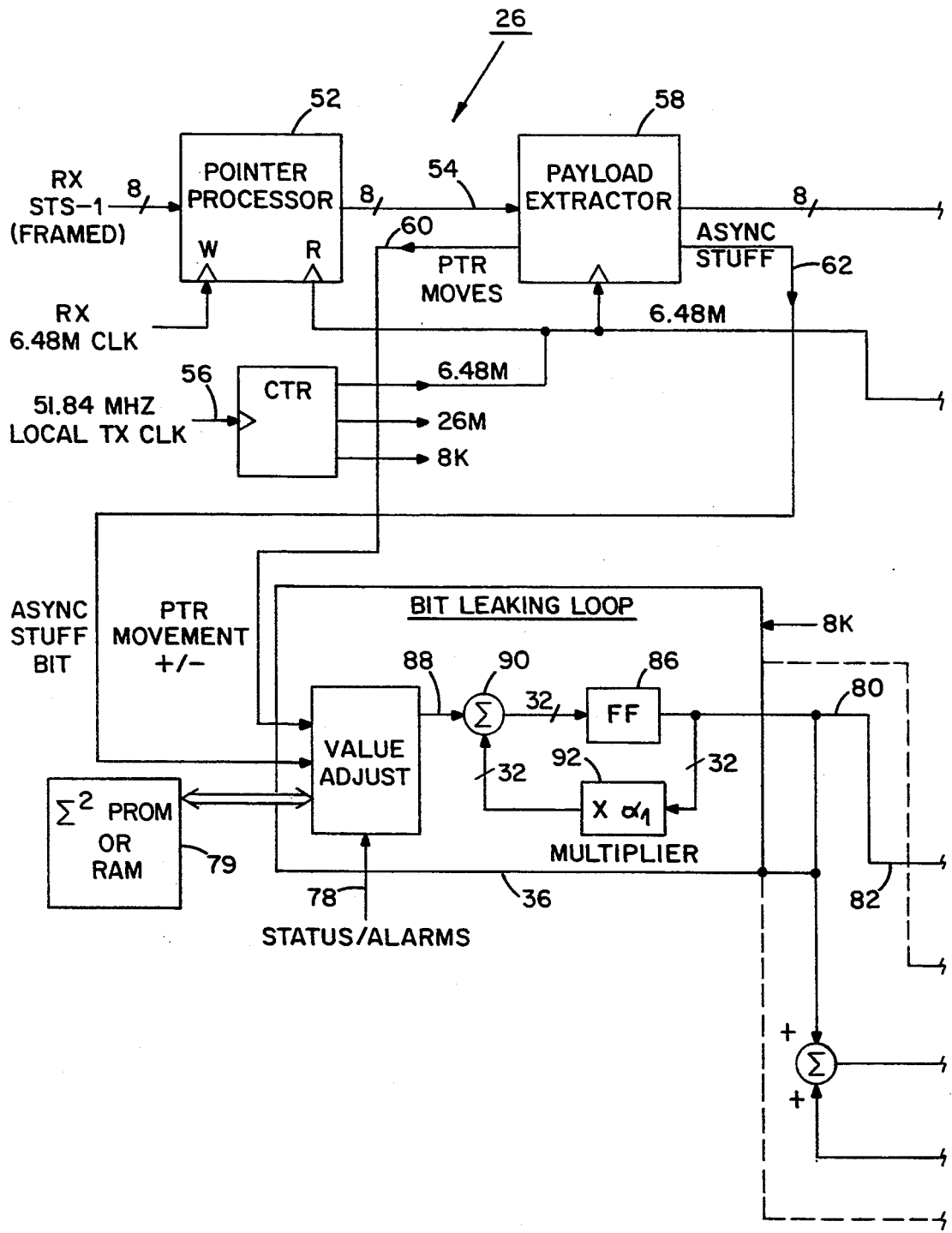
FIG. 2, consisting of FIGS. 2A and 2B, is an overall block diagram of the desynchronizer according to the present invention.
Figure 2B:
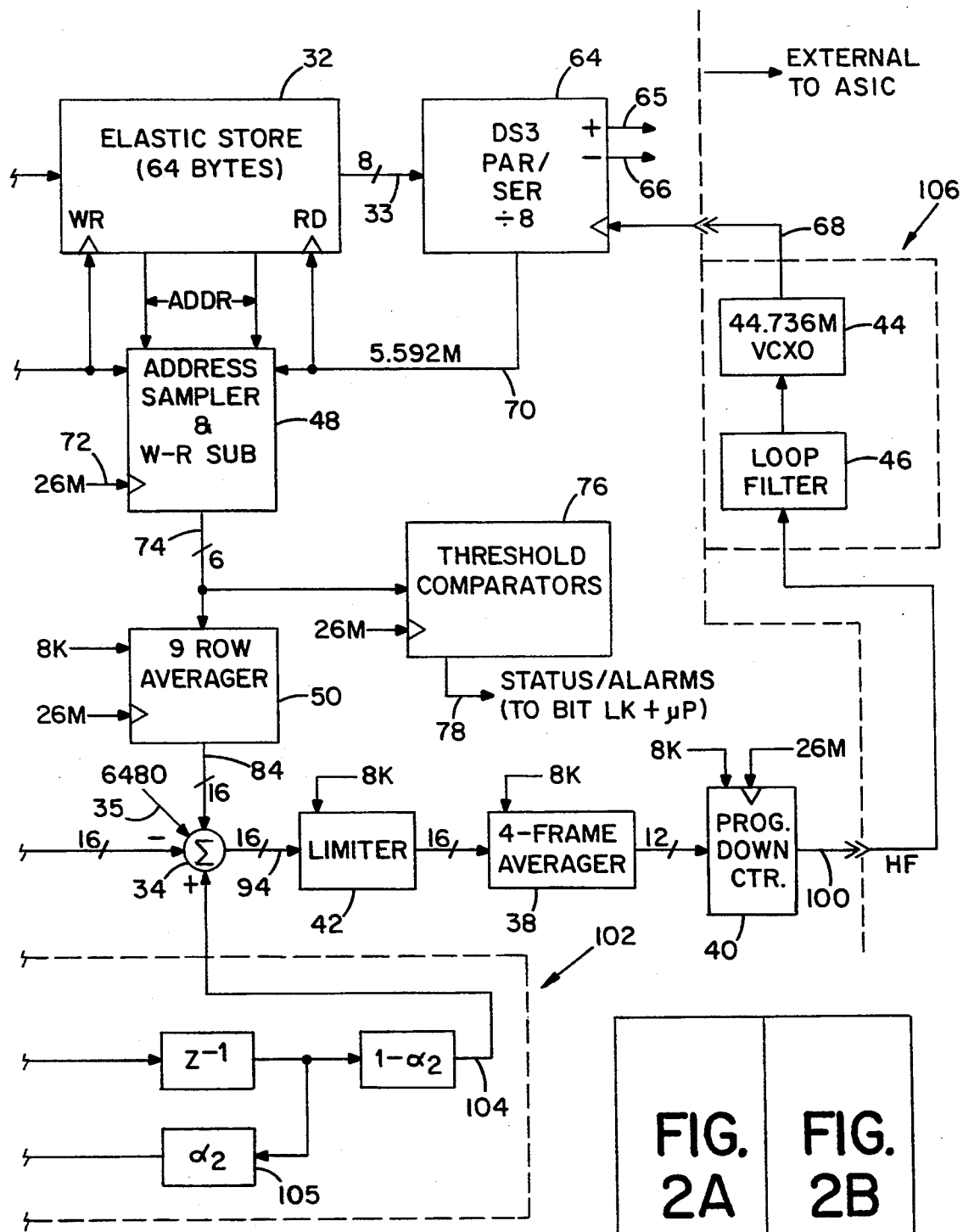

As best seen in FIG. 2, desynchronizer 26 includes a plurality of modules wherein the underlying concepts are based upon linear modeling such that performance will gracefully degrade if normal thresholds are exceeded. The bit leaking phase lock loop module 36 is a digital filter with a nominal 0.1 Hz bandwidth.

Pointer movements and asynchronous stuff bit rate information are stored within this desynchronizer 26 and are leaked out with a 1.6 second time constant. A pointer movement causes a shift in the write minus read (W−R) addresses of the 64 byte elastic store 32 which also appears at the output of subtractor block 34.

The same pointer movement is detected and stored within the bit leaking loop module 36 where it is then subtracted from the elastic store W−R address shift and is thereby "hidden" from the digital to analog (D/A) output function associated with 4-frame averager 38 and programmable downcounter 40. This output is also effectively hidden from the high speed phase lock loop comprising limiter 42, 4-frame averager 38, programmable downcounter 40, 44.736 Mhz voltage control crystal oscillator (VCXO) 44, loop filter 46, further in conjunction with elastic store 32, address sampler 48, 9 row averager module 50, and subtractor module 34.

The high speed phase lock loop is designed to have an 80 Hz bandwidth with a resultant time constant of approximately 2 milliseconds in this disclosure, but could practically be designed with a bandwidth down to about 10 Hz.

The normal operating range in the elastic store can accommodate approximately plus or minus 17 pointer movements before the first set of thresholds are exceeded, which thereby changes the bit leaking loop bandwidth to 1.0 hz. Operation here exceeds DS3 jitter specifications by approximately two to three times, but generally causes no data loss anywhere within the entire DS3 link.

If movement in the elastic store continues to the second set of thresholds, all pointer inputs to the bit leaking block 36 are disabled and the asynchronous stuff bit rate is set to the nominal 3 bits per frame. This result causes rapid movement back to the center of the store due to the two millisecond time constant of the high speed phase lock loop. In this situation DS3 jitter specifications are exceeded, as the 8 unit interval (UI) pointer movements or synchronization transients on the asynchronous stuff bit, are only filtered with a 2 millisecond time constant. Data loss will generally not occur within the desynchronizer circuitry, but could occur in the connected DS3 equipment, depending on its loop bandwidth and elastic store size.

If pointer movement continues to the third set of thresholds, an overflow condition is declared. In this situation, the W−R address is reset to 32 (the half full location) and the registers associated with bit leaking loop module 36 are cleared. The threshold comparators are reset, with overflow reported to software and with some data loss occurring.

Description of Desynchronizer Modules

Pointer Processor 52

The pointer processor module is a 16 byte elastic store with +/− pointer adjustment thresholds which are at least 9 bytes apart. This processor is used to eliminate any OC-N jitter on the receive frame rate, which cannot be accommodated by the follow-on sampled data digital bit-leaking circuitry (aliasing potential). The pointer processor output 54 generates a parallel "frame" synchronized to the local node clock rate; namely, 51.84 Mhz received on clock input line 56.

Payload Extractor 58

The payload extractor synchronizes to the synchronous payload envelope (SPE) received within the STS-1 frames. It extracts the Path overhead contained within the SPE and extracts DS3 data bits, also within the SPE. These data bits are held until a whole byte of DS3 data is available, which is then sent to the elastic store 32. The payload extractor also sends output pointer movement on output line 60 and asynchronous stuff bit information on output 62. Both of these outputs are transferred to the bit leaking loop module 36 where the pointer movements and asynchronous stuff bit information are accumulated in the low bandwidth digital phase lock loop formed by the bit leaking loop module 36.

Elastic Store 32

Figure 5:
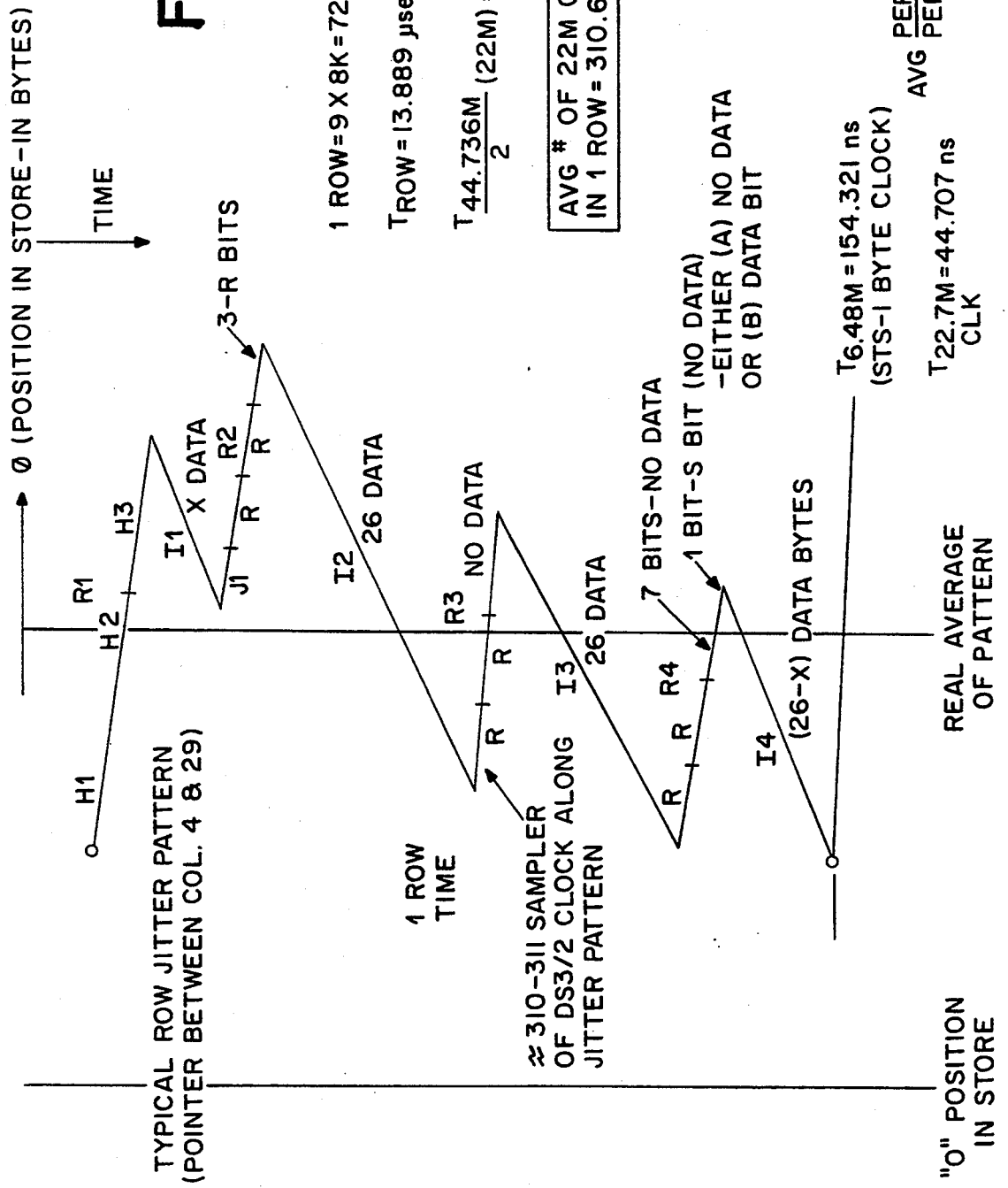
FIG. 5 is a graph showing the effects of row averaging of the elastic store position versus time.

The elastic store size in the preferred embodiment of the present invention is 64 bytes. This size allows for a +/− 17 pointer movements before thresholds are exceeded. A store of 48 bytes could be used which would accommodate approximately +/− 10 bytes of pointer movement before exceeding thresholds. A 48 byte size makes the binary subtraction difficult at high speeds, such as at 26 Mhz. A store size of $2^n$ (32, or 64 for example) simplifies the subtraction of 2's compliment numbers. Two 6 bit counters are used within the elastic store to keep track of write and read addresses. The write clock is the local STS-1 1 byte clock rate which, as shown, is 6.48 Mhz. The read clock rate is the DS3 byte clock rate of 5.592 Mhz. FIG. 5 illustrates the elastic store position in bytes versus time.

DS3 Parallel/Serial Shift Register 64

This module receives the 8 bit parallel DS3 data read from elastic store 32 on output line 33 and converts this data into serial data in an 8 bit, parallel load, shift register. The dam is then encoded into B3ZS format (binary three zero substitution—see section 4.3.3 of *Digital Telephony*, Second Edition) and the resulting +/− data stream is outputted on lines 65 and 66. The DS3 input clock is received on line 68 from the external VCXO module 44 and is then divided by 8 in order to generate the DS3 byte rate of 5.592 Mhz as sent on output line 70.

Address Sampler and W−R Subtractor 48

This module samples the DS3 byte clock on line 70 with a 26 Mhz clock from input 72. This 26 Mhz clock is actually the STS-1 clock of 51.84 Mhz received on input 56 divided by 2. The module determines when both the read and write address counter outputs are stable and latches each address with the 26 Mhz clock. These addresses are then subtracted, using a 2's compliment subtractor, and output as a 6 bit value on output bus 74. This value is stable on every 26 Mhz clock edge.

Threshold Comparators 76

The threshold comparators are used to warn when abnormal conditions exist which could lead to elastic store overflow if action is not taken. The comparators monitor the W−R address value on the line 74 during every 26 Mhz clock edge. The comparators have hysteresis, so that intermittent switching of modes is avoided.

The normal operating range is in the center of the W−R range or, for the 64 byte elastic store, at a value of 32. If a first set of thresholds are exceeded (such as +/−17 bytes from center), a status bit is set in the bit leaking loop module 36 as generated by the status outputs on line 78. This same status information is also sent via software to an associated microprocessor (not shown) so as to report the condition of the threshold.

If the second set of thresholds is exceeded, a second status bit is sent to the bit leaking loop and also reported to the microprocessor.

If the third set of thresholds is exceeded, an overflow condition is declared to both the microprocessor and the bit leaking loop module. The threshold comparators are then reset.

9 Row Averager 50

The 9 row (one frame) averager accumulates the W−R counts for 9 rows which comprises 125 microseconds. This accumulation represents 3,240 clock cycles of the 26 Mhz clock received on input line 72. The maximum value accumulated in 9 rows, or one frame is 3240×64=207,360. This value can be represented by an 18 bit word which is the required width of the adder and register within this block. The value is latched on frame boundaries, and the register cleared to accumulate a new count. The specific point in the frame, where the value is latched is tied to the pointer increment-/decrement location which is the H2/H3 byte boundary. It is important to note that when a pointer movement occurs (that is, a change in the H1, H2 value), the new value is accumulated for the whole averaging period and therefore arrives at subtracter module 34 at the end of the next frame. The arrival of the count increment coming from the bit leaking loop module on bus 80 to subtracter 34 is matched with the increment coming from the 9 row averager on its output 84. Only the upper 15 bits of the 9 row averager output are sent to the subtracter with the 16th most significant bit set to 0 since the 16th bit is the 2's compliment sign for a positive number. FIG. 5 illustrates the average W−R position versus time.

Bit Leaking Loop Module 36

Figure 3:
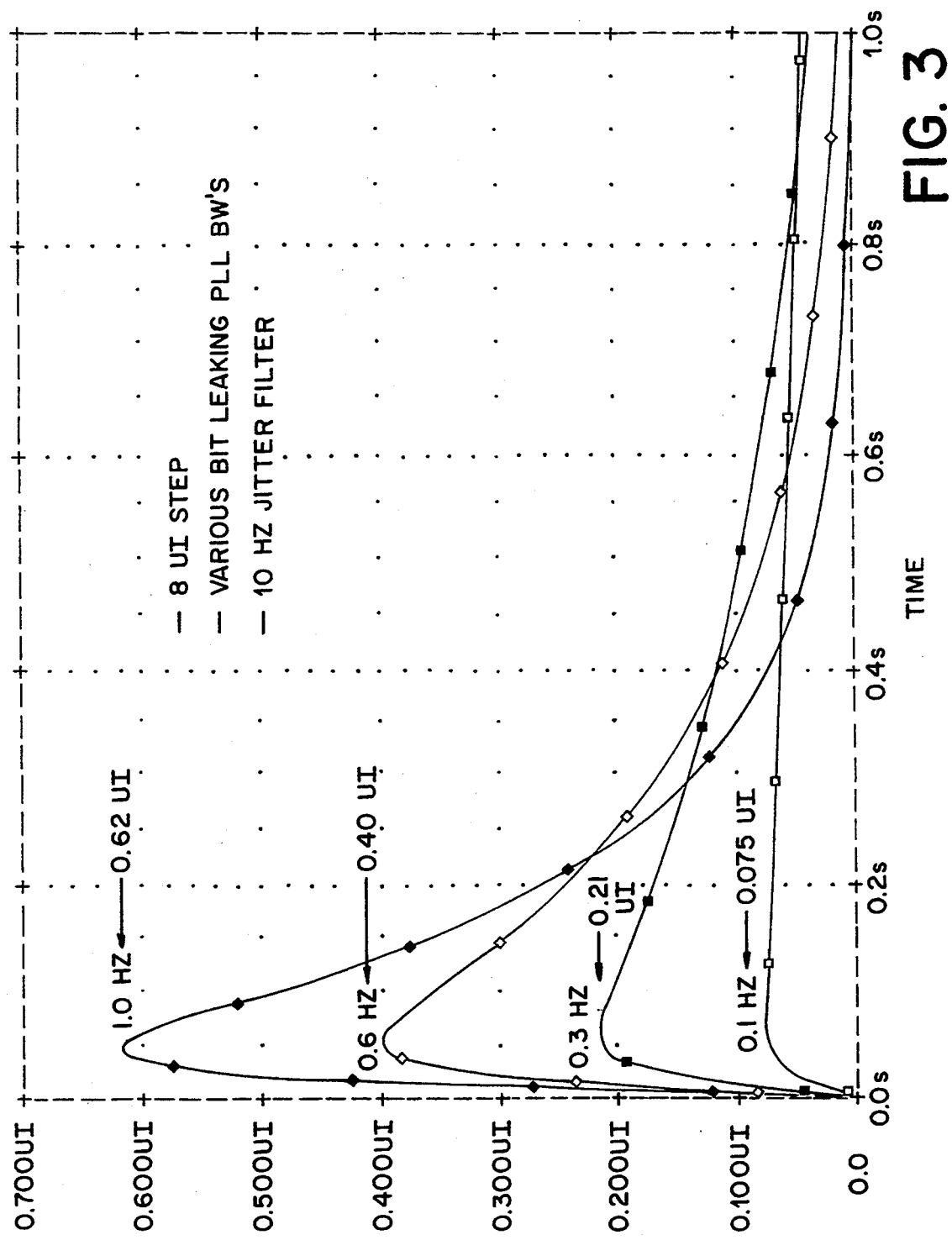
FIG. 3 is a graph showing DS3 jitter using various bit leaking phase locked loop bandwidths.
Figure 4:
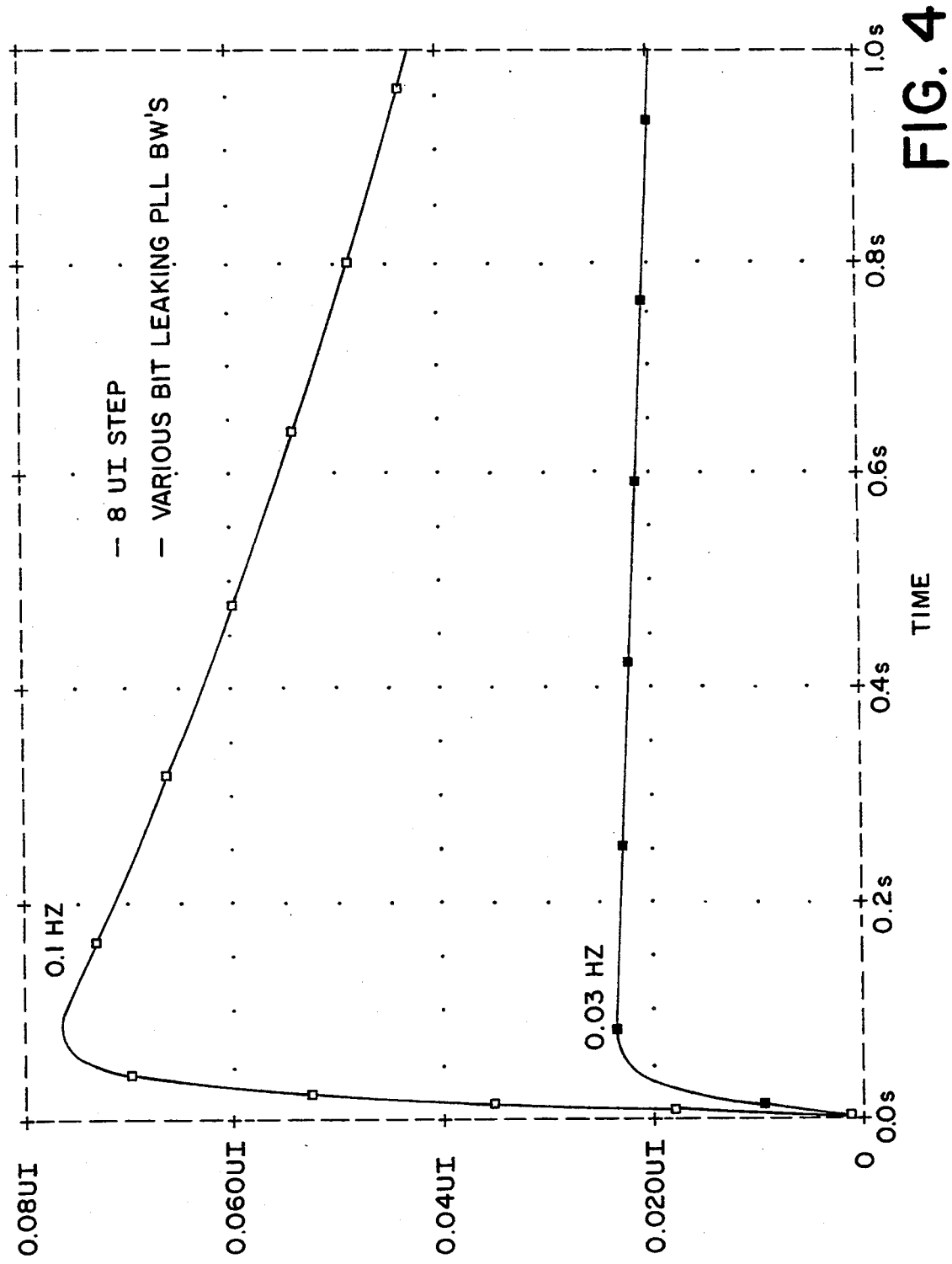
FIG. 4 is another graph showing DS3 jitter using various bit leaking phase locked loop bandwidths.

This module adds pointer movements and asynchronous stuff bits to the bit leaking loop register 86. This register is updated every frame, that is every 8 Khz, and the register contents are ultimately presented to subtractor module 34 after modification by module 102 to be discussed below. In addition to adding pointer movements in DS3 asynchronous stuff bits every frame at input 88 of adder 90, the loop also performs the equivalent of a digital high pass filter (HPF) on values coming into the bit leaking register. The digital filter is clocked at an 8 Khz frame rate, and multiplies the register contents (86) which are 32 bits wide by a constant value $\alpha_1$ as performed by multiplier 92. This multiplier is close to but always less than 1. The constant at in the disclosed embodiment is equal to 0.99992416 for a high pass filter with a 0.1 Hz bandwidth. Thus pointer movements appear at the output of the filter almost immediately and then decay exponentially to 0 as would occur with an analog high pass filter. The filter bandwidth is chosen to make the jitter contribution from each pointer movement to be approximately 0.075 unit interval (UI). FIGS. 3 and 4 illustrate DS3 jitter vs. pointer movement and desynchronizer bandwidth for an 8 UI step which represents 8 bits of jitter.

Thus 10 pointer movements in a row, each of 8 UI size would generate about 0.75 UI jitter. The multiply performed by $a_1$ is an operation which is a 32 bit multiply that is implemented serially using 32 bit adders and shift registers.

A pointer movement does not represent exactly 8 bits of equivalent movement in the elastic store, but depends on the position of the start of the SPE and the shape of the jitter pattern. The exact values of the shift of the jitter pattern average are retrieved for each pointer movement. Pointer adjustment activity, along with the STS-1 column number of the pointer, are received from the payload extractor module 58. The shift of the jitter pattern avenge is computed vs. the column in which the pointer is present, and the direction of pointer movement. Further details concerning such pointer movement is presented in Table 2.

In the preferred embodiment of the present invention, these values have been reduced to a two digit hexadecimal number (that is, 8 bits) which are stored in an EEPROM, or other memory module 79, of 2 k bits in size. Dual ported RAM could be used instead of EEPROM if there is a microprocessor available (not shown). Thus, for every pointer movement, the exact value of the elastic store avenge position shift is retrieved and added to the bit leaking loop register. This number is actually scaled so that the magnitude added to register 86 as presented to subtracter module 34 at input 82 nearly matches the elastic store average output as presented by output 84 from 9 row averager module 50, thereby nearly completely cancelling these two values at output 94 of subtracter module 34. If this compensation procedure is not used, an error of up to 0.3 bit per pointer adjustment can occur relative to the avenge shift of 7.1 bits per pointer movement. This error would quickly reach the high-speed phase lock loop and then be seen as DS3 jitter. Thus, only three to five pointer movements can be accommodated before exceeding the DS3 jitter specifications (currently about 0.25 VI jitter per pointer adjustment).

Since the pointer adjustments and asynchronous stuff bits are entered into the bit leaking loop module 36, subtracted from the 9 row averager count, and gradually leaked out, the architecture has the net effect of being a low pass filter, which in the given example, has a bandwidth of 0.1 Hz. This low pass filter is with respect to pointer movements and changes in the asynchronous stuff rate. The coefficient $a_1$ is provisionable and can be changed to create a 1.0 Hz bandwidth for the digital filter when elastic store thresholds are exceeded. Various $\alpha$ values vs. bandwidths are presented in Table 3. FIGS. 3 and 4 illustrate output jitter versus time for various bit leaking loop bandwidths. These figures assume a jitter measurement high pass filter bandwidth of 10 Hz.

TABLE 2

Δ Movement In Elastic Store
AVERAGED DATA (IN BITS PER POINTER STEP)

| Pointer Column Position | Pos. (+) | Neg. (−) |
|---|---|---|
| 4 | 7.1678 | −6.8364 |
| 5 | 7.1701 | −7.1697 |
| 6 | 7.1695 | −7.1669 |
| 7 | 7.1724 | −7.1686 |
| 8 | 7.1707 | −7.1715 |
| 9 | 7.1690 | −7.1697 |
| 10 | Movement to 7.1713 Column 11 | −7.1680 ← movement from Column 10 to Column 9 |
| 11 | 7.1673 | −7.1703 |
| 12 | 7.1730 | −7.1663 |

TABLE 2-continued

Δ Movement In Elastic Store
AVERAGED DATA (IN BITS PER POINTER STEP)

| Pointer Column Position | Pos. (+) | Neg. (−) |
|---|---|---|
| 13 | 7.1690 | −7.1720 |
| 14 | 7.1695 | −7.1680 |
| 15 | 7.1678 | −7.1686 |
| 16 | 7.1650 | −7.1669 |
| 17 | 7.1690 | −7.1640 |
| 18 | 7.1730 | −7.1680 |
| 19 | 7.1707 | −7.1720 |
| 20 | 7.1673 | −7.1697 |
| 21 | 7.1707 | −7.1663 |
| 22 | 7.1696 | −7.1697 |
| 23 | 7.1713 | −7.1686 |
| 24 | 7.1713 | −7.1703 |
| 25 | 7.1695 | −7.1703 |
| 26 | 7.1718 | −7.1686 |
| 27 | 7.1690 | −7.1709 |
| 28 | 7.1672 | −7.1680 |
| 29 | 7.1707 | −7.1663 |
| 30 | 6.9378 | −7.1609 |
| 31 | 6.9082 | −6.9668 |
| 32 | 6.9112 | −6.9072 |
| 33 | 7.1632 | −6.8889 |
| 34 | 7.1724 | −7.1651 |
| 35 | 7.1684 | −7.1715 |
| 36 | 7.1724 | −7.1674 |
| 37 | 7.1707 | −7.1715 |
| 38 | 7.1707 | −7.1697 |
| 39 | 7.1695 | −7.1697 |
| 40 | 7.1684 | −7.1686 |
| 41 | 7.1741 | −7.1674 |
| 42 | 7.1678 | −7.1732 |
| 43 | 7.1713 | −7.1669 |
| 44 | 7.1621 | −7.1703 |
| 45 | 7.1684 | −7.1611 |
| 46 | 7.1707 | −7.1675 |
| 47 | 7.1707 | −7.1697 |
| 48 | 7.1690 | −7.1698 |
| 49 | 7.1701 | −7.1680 |
| 50 | 7.1718 | −7.1692 |
| 51 | 7.1684 | −7.1709 |
| 52 | 7.1724 | −7.1674 |
| 53 | 7.1678 | −7.1715 |
| 54 | 7.1724 | −7.1669 |
| 55 | 7.1701 | −7.1715 |
| 56 | 7.1701 | −7.1692 |
| 57 | 7.1684 | −7.1692 |
| 58 | 7.1690 | −7.1674 |
| 59 | 6.9089 | −7.2142 |
| 60 | 6.9107 | −6.9061 |
| 61 | 6.9107 | −6.9107 |
| 62 | 7.1638 | −6.8644 |
| 63 | 7.1724 | −7.1657 |
| 64 | 7.1661 | −7.1715 |
| 65 | 7.1741 | −7.1651 |
| 66 | 7.1701 | −7.1732 |
| 67 | 7.1701 | −7.1692 |
| 68 | 7.1695 | −7.1692 |
| 69 | 7.1707 | −7.1686 |
| 70 | 7.1713 | −7.1697 |
| 71 | 7.1701 | −7.1703 |
| 72 | 7.1701 | −7.1692 |
| 73 | 7.1632 | −7.1692 |
| 74 | 7.1696 | −7.1623 |
| 75 | 7.1655 | −7.1686 |
| 76 | 7.1736 | −7.1646 |
| 77 | 7.1690 | −7.1726 |
| 78 | 7.1707 | −7.1680 |
| 79 | 7.1690 | −7.1698 |
| 80 | 7.1718 | −7.1680 |
| 81 | 7.1718 | −7.1709 |
| 82 | 7.1684 | −7.1709 |
| 83 | 7.1724 | −7.1674 |
| 84 | 7.1678 | −7.1715 |
| 85 | 7.1724 | −7.1669 |
| 86 | 7.1667 | −7.1715 |
| 87 | 7.0537 | −7.1890 |
| 88 | 6.9103 | −7.0985 |

TABLE 2-continued

Δ Movement In Elastic Store
AVERAGED DATA (IN BITS PER POINTER STEP)

| Pointer Column Position | Pos. (+) | Neg. (−) |
|---|---|---|
| 89 | 6.9112 | −6.9084 |
| 90 | 6.9061 | −6.9112 |

Subtractor Module 34

The subtractor module contains a 16 bit, 2's compliment subtractor. It is required to produce a new value every 125 microseconds, which corresponds to an 8 Khz rate. The count from the 9 row avenger module 50 which is originally an 18 bit positive number is truncated to the fifteen most significant bits with a 0 appended to the most significant bit for a 2's compliment positive number. The number from bit leaking loop module 36 on bus 82 is scaled and in 2's compliment form.

A software provisional feature reduces the delay through the desynchronizer by setting the average W−R value to 16 bytes, equivalent to an effective 32 byte elastic store size. This can be implemented by adding the binary equivalent of a number called offset, to the difference count as described above. Thus, an offset=[16×3240]/8=6480 is input to summer 34 at but input 35.

Range Limiter 42

This module limits the digital count of subtractor module 34 to a range of 0 to 25,920 (207, 360 requires 18 bits, the required 15 bit equivalent is 207,360/8=25,920). This module avoids positive feedback to the high speed phase lock loop 106.

4 Frame Avenger 38

Since there are only 3,240 clock cycles of 26 Mhz in an 8 Khz period, the maximum resolution per frame deliverable to the programmable downcounter 40 is 1/3240. The row averager count cannot be easily extended to more than 9 rows to increase resolution since a 2 Khz square wave at the high frequency output of the D to A function is difficult to filter in a high speed phase lock loop of a bandwidth of 80 Hz. A 4 frame avenger might examine the average of 4 frames and if the count were stable, might use the upper 12 bits of the base number and the next two least significant bits as a time interpolation of the base number and the next two least significant bits as a time interpolation of the base number. This might give a resolution of 1/12960, or 0.04 UI. Thus, such a technique may provide increased resolution.

Programmable Downcounter (D/A Function) 40

The digital to analog function performed by the programmable downcounter converts the 12 bit digital count from the 4 frame averager with a range of 0 to 3,240, to a variable duty cycle 8 Khz output on output 100 labeled HF. The duty cycle range is from 0 to 1.0 with a resolution of one part in 3,240. This resolution is equivalent to a 12 bit digital to analog converter or to a 14 bit converter when the time interpolation function is enable by the 4 frame avenger module 38.

High Speed Phase Lock Loop 106

The high speed phase lock loop comprises a phase reference as generated by the DS3 write data rate, a phase detector comprised of the address sampler 48, 9 row averager 50, a loop filter 46, and a 44.736 Mhz VCXO 44. A phase reference is presented to the high speed phase lock loop as generated by the address sampler 48 in conjunction with 9 row averager 70, subtractor module 34, limiter 96, 4 frame averager 38 and programmable downcounter (D to A function) 40. The high speed loop has an 80 Hz loop bandwidth which represents a time constant of 2 milliseconds. This bandwidth provides adequate filtering of jitter if pointer adjustments are not present, as well as an acceptable lock time. The loop is a second order, type 2 (two poles at DC) loop and uses a lead-lag active loop filter.

STS-1 Frequency Offset Correction Module 102

As seen in FIG. 1, a potential problem associated with a DS3 desynchronizer or any type of desynchronizer for digital networks occurs when a constant frequency offset exists between node 0 and node N. Thus, a situation can exist where f(n) is equal to f(0) plus an offset, Δf. In such a situation, the bit leaking loop module 36 stable point at (80) associated with high pointer adjustment frequencies exceeds the size of elastic store. The solution is presented by module 102 which, in combination with line 82, forms a high pass filter having a long time constant $\tau$ to allow continuous pointer adjustments at a high rate. In the implementation shown in FIG. 2, the offsets at output 80 can be large, depending upon the bandwidth associated with the bit leaking loop module 36 and the pointer arrival rate which depends upon the Δf. The value at output 80 for Δf=the 40 ppm offset frequency and a 0.1 Hz bandwidth for the bit leaking loop 36 can be as high as 415 bytes. Thus, module 102 is a low pass filter with unity gain. Its output 104 is subtracted from the value at output 80 and the value of this subtraction has an average value of 0 but with a 1 byte peak-to-peak saw-tooth waveform at the pointer arrival rate. The bandwidth of module 102 is much lower than that of the bit leaking loop module 36. The module 102 has 32 bit resolution with a value of $\alpha_2$ for multiplier module 105 equal to 0.99999952316.

The overall result of output 80 minus output 104 being 0 is that the elastic store is centered even though such shifts in frequency are present. The clock rate of module 102 is 8 Khz, the same as that of the bit leaking loop module 36.

The overall result is that the desynchronizer according to the present invention is able to leak out pointer movement adjustment and asynchronous stuff bits from transmission of digital synchronous communications from network element to network element in a manner which meets jitter specifications of any arbitrary mount. In addition, frequency variations between modules which would otherwise cause overflow or underflow of the elastic store are accommodated by a digital high pass filter associated with the desynchronizer.

TABLE 3

| | $\alpha_2$ For Higher Bandwidths - "Fast" Lock Mode | | | |
|---|---|---|---|---|
| BW | $\tau$ (sec) | n (fs = 8KHz) | α10 (Base) (10) | "Fast" Lock Mode |
| 0.1 Hz | 1.591549431 | 12,732.39545 | 0.9999214633 | .FFFADA5F |
| 0.2 Hz | 0.795774716 | 6366.197724 | 0.999842933 | .FFF5B4DA |
| 1.0 Hz | 0.159154943 | 1273.239545 | 0.999214910 | .FFCC8C60 |
| 10.0 Hz | 1.591549431 × $10^{-2}$ | 127.3239545 | 0.992176780 | .FDFF4C26 |

TABLE 3-continued

| | | $a_2$ For Higher Bandwidths - "Fast" Lock Mode | | |
|---|---|---|---|---|
| BW | $\tau$ (sec) | n (fs = 8KHz) | a10 (Base) (10) | "Fast" Lock Mode |
| 3.0 Hz | $5.30516477 \times 10^{-2}$ | 424.4131816 | 0.997646579 | .FF65C426 |

Having described the invention, what is claimed is:

1. A desynchronizer for use with a digital communication network, the digital communication network transmitting information in frames containing payloads, the payloads containing data residing within said frames, each payload having a pointer position identifying its starting location within a frame, and wherein the data within each payload may contain at least one stuff bit, the desynchronizer adjusting a read data clock rate for reading the payload data, the desynchronizer comprising:

a) means for receiving the transmitted information and for extracting the pointer position and stuff bit information therefrom;

b) means for generating a write clock rate;

c) means connected to the extracting means, for extracting the payload data from the frames of data based upon the write clock rate;

d) means connected to the payload data extracting means, for storing the payload data within an addressable write/read elastic store module accessible by corresponding write and read addresses, said module having a nominal relative center position representing the nominal difference between the write and read addresses;

e) means for reading payload data from the elastic store module based upon the read data clock rate and for generating a serial output of said read data;

f) means connected to the elastic store module, for determining the difference between the write and read addresses (W−R) of the elastic store module;

g) means for accumulating the W−R difference for a plurality of samples so that the W−R difference has a predetermined bit resolution;

h) means connected to the pointer position and stuff bit information extracting means, for scaling the pointer position and stuff bit information so as to correspond in bit resolution to the accumulated W−R difference, and means for digitally high pass filtering the scaled pointer position and stuff bit information so that changes in the pointer position and stuff bit information from frame to frame are passed to an output of the filtering means at which said changes then decay exponentially to zero;

i) means for subtracting, at a bit resolution corresponding to the bit resolution of the accumulation means and the digital high pass filtering means, the output of the digital high pass filtering means from the output of the accumulating means to determine a number representative of their difference; and j) means for receiving said representative number and for generating the read data clock rate whose frequency is adjusted according to this representative number so as to re-center the elastic store module to its nominal center position;

whereby changes in pointer position and stuff bit information are adjusted with high resolution such that the elastic store module is returned to its nominal relative center position without generating rapid phase changes and jitter on the read data clock rate.

2. A desynchronizer as defined in claim 1, wherein the scaling means connected to the pointer position and stuff bit information extracting means includes a lookup table which contains values corresponding to changes in the elastic store write addresses based upon pointer position within the frame and changes in pointer position from frame to frame for all possible pointer positions within the frame, and wherein said digital high pass filtering means retrieves an elastic store write address change value from the lookup table based upon pointer position within the frame and the change in the pointer position.

3. A desynchronizer as defined in claim 2, wherein the digital high pass filtering means comprises a register having an input and an output, the output corresponding to the output of the digital high pass filtering means, the register for storing the output value of the digital high pass filtering means, a multiplier for receipt of said output value and for multiplying it by a value less than one, and a summer for summing the scaled pointer position and stuff bit information, plus the value from the multiplier output, the result of the summer defining the input to the register.

4. A desynchronizer as defined in claim 3, wherein the means for accumulating the W−R difference performs the accumulation at a rate equal to a multiple of the number of bytes in one frame.

5. A desynchronizer as defined in claim 4, wherein the means for receiving the representative number and for generating the read data rate includes means for generating a variable duty cycle signal having a constant frequency, whose duty cycle is proportional to the W−R difference from the elastic store module, which is further used to control the read data clock rate.

6. A desynchronizer as defined in claim 5, wherein the means for receiving the representative number and for generating the read data clock rate comprises a loop filter which receives the variable duty cycle signal and a variable controlled oscillator connected to the loop filter as part of a wide bandwidth phase-locked loop having a bandwidth greater than that of the digital high pass filtering means connected to the pointer position and stuff bit information extracting means.

7. A desynchronizer as defined in claim 6, further comprising a threshold comparator module for determining if the absolute value of the W−R value as compared to the elastic store nominal relative center position exceeds a first threshold value and if so, setting a status bit indicative of this occurrence, said status bit communicated with the digital high pass filtering means to increase the bandwidth of said digital high pass filtering means.

8. A desynchronizer as defined in claim 7, wherein the threshold comparator further comprises means for determining if the absolute value of the W−R value as compared to the elastic store nominal relative center position exceeds a second threshold value greater than the first threshold value, and if so for setting a second status bit which is communicated to the digital high pass filtering means to disable all inputs to said digital high pass filtering means and thereby cause rapid movement of the W−R value back to the nominal relative center of the elastic store module.

9. A desynchronizer as defined in claim 8, wherein the threshold means has means for determining if the absolute value of the W−R value as compared to the elastic store nominal relative center position exceeds a third threshold value, and if so to set a third status bit, said status bit communicated to the elastic store module so as to cause the elastic store module to reset its W−R value to the nominal relative center position.

10. A desynchronizer as defined in claim 7, wherein said status bit from the threshold comparator increases the bandwidth of the digital high pass filtering means by decreasing the value of the multiplier.

11. A desynchronizer as defined in claim 10, wherein the value of the multiplier for a bandwidth of the digital high pass filtering means is set forth in the following table:

TABLE

| BANDWIDTH | VALUE OF MULTIPLIER |
|---|---|
| 0.1 Hz | 0.9999214633 |
| 0.2 Hz | 0.999842933 |
| 1.0 Hz | 0.999214910 |
| 3.0 Hz | 0.997646579 |
| 10.0 Hz | 0.992176780 |

12. A desynchronizer as defined in claim 2, further comprising adjusting means connected to the output of the digital high pass filtering means for presenting an output to the means for subtracting the output of the digital high pass filtering means from the output of the accumulating means, such that the subtraction has a value of zero with a one byte peak-to-peak sawtooth waveform at the pointer arrival rate when continuous pointers are received so as to re-center the elastic store module when a constant frequency offset between nodes of the network exist.

13. A desynchronizer as defined in claim 12, wherein said adjusting means comprises a multiplier, a summer, and a register, wherein the multiplier has a value less than one and is connected to the output of the register, so as to yield a bandwidth which is much lower than the bandwidth of the digital high pass filtering means.

14. A desynchronizer as defined in claim 1, further comprising adjusting means connected to the output of the digital high pass filtering means for presenting an output to the means for subtracting the output of the digital high pass filtering means from the output of the accumulating means, such that the output of the adjusting means is equal to the long term average output of the high pass filtering means, which when added to the output of the digital high pass filtering means at the subtractor, causes the average elastic store position to re-center when continuous pointer activity is present due to a constant frequency offset between nodes of the network.

15. A desynchronizer as defined in claim 2, further comprising a threshold comparator module for determining if the absolute value of the W−R value as compared to the elastic store nominal relative center position exceeds a first threshold value and if so, setting a status bit indicative of this occurrence, said status bit communicated with the digital high pass filtering means so as to increase the bandwidth of said digital high pass filtering means.

16. A desynchronizer as defined in claim 1, further comprising a threshold comparator module for determining if the absolute value of the W−R value as compared to the elastic store nominal relative center position exceeds a first threshold value and if so, setting a status bit indicative of this occurrence, said status bit communicated with the digital high pass filtering means so as to increase the bandwidth of said digital high pass filtering means.

17. A desynchronizer for use with a digital communication network, the digital communication network transmitting information in a plurality of frames, each frame comprising a payload containing data, wherein the starting location of each payload is defined by a pointer position, and wherein the data within each payload may contain at least one stuff bit, the desynchronizer for adjusting a read data clock rate for reading the payload data, the desynchronizer comprising:

a) means for receiving the transmitted information and for extracting the pointer position of the payload, stuff bit information, as well as the payload data from the frames of data received;

b) means connected to the extracting means, for storing the payload data within an addressable write-/read elastic store module accessible by corresponding write and read addresses, said module having a nominal relative center position representing the nominal difference between the write and read addresses;

c) means for reading payload data from the elastic store based upon the read data clock rate, said reading means generating a serial output of said read data;

d) means connected to the elastic store, for determining the difference between the write and read addresses (W−R) of the elastic store;

e) a lookup table which contains values corresponding to changes in the elastic store write addresses based upon pointer position within the frame and changes in pointer position between frames, for all possible pointer positions within the frame;

f) means connected to the pointer position and stuff bit information extracting means and to the lookup table, for digitally high pass filtering the stuff bit information and a value from the lookup table determined by the pointer position within the frame and the change in the pointer position, so that changes in the elastic store write address based upon pointer position Within the frame and changes to the pointer position and the stuff bit information from frame to frame are passed to the output of the filtering means at which said changes then decay exponentially to zero;

g) means for subtracting the output of the digital high pass filtering means from the W−R address difference to determine a number representative of the difference between the output of the digital high pass filtering means and the W−R address difference; and h) means for using the representative number to generate the read data clock rate whose frequency is adjusted according to this representative number.

18. A desynchronizer as defined in claim 17, wherein the digital high pass filtering means comprises a register for storing the value to be output by the filter, a multiplier for receipt of the register value and for multiplying it by a value less than one, and a summer for summing the lookup table value based upon the pointer position, the stuff bit information, and the value from the multiplier output, the result of the summer defining an input to the register.

19. A desynchronizer as defined in claim 18, wherein the means for using the representative number to generate the read data rate includes means for generating a variable duty cycle signal having a constant frequency, whose duty cycle is proportional to the W−R difference from the elastic store module nominal relative center position, which is used to control the read data clock rate.

20. A desynchronizer as defined in claim 19, further comprising a threshold comparator module for determining if the absolute value of the W−R value as compared to the elastic store nominal relative center position exceeds a first threshold value and if so, setting a status bit indicative of this occurrence, said status bit communicated with the digital high pass filtering means to increase the bandwidth of said digital high pass filtering means.

21. A desynchronizer as defined in claim 20, wherein the threshold comparator further comprises means for determining if the absolute value of the W−R value as compared to the elastic store nominal relative center position exceeds a second threshold value greater than the first threshold value, and if so for setting a second status bit which is communicated to the digital high pass filtering means to disable all inputs to said digital high pass filtering means and thereby cause rapid movement of the W−R value back to the nominal relative center position of the elastic store module based upon changes in the pointer and stuff bit information appearing directly at the output of the subtracting means, thereby causing rapid adjustment of the read dam clock rate.

22. A desynchronizer as defined in claim 21, wherein the threshold means has means for determining if the absolute value of the W−R value as compared to the elastic store nominal relative center position exceeds a third threshold value, and if so to set a third status bit, said status bit communicated to the elastic store module to cause the elastic store module to reset its W−R address to the nominal relative center position.

23. A desynchronizer as defined in claim 17, wherein each frame comprises a plurality of columns, and wherein the lookup table values are based upon the column of the frame where the change in pointer position between frames has occurred.

24. A desynchronizer as defined in claim 23, wherein the frame comprises ninety columns with 87 possible pointer positions and wherein the lookup table values are defined by the following table, where a positive change in pointer position is from column n to column n+1, and a negative change in pointer position is from column n to column n−1;

Δ Movement In Elastic Store
AVERAGED DATA (IN BITS PER POINTER STEP)

| Pointer Column Position | Pos. (+) | Neg. (−) |
|---|---|---|
| 4 | 7.1678 | −6.8364 |
| 5 | 7.1701 | −7.1697 |
| 6 | 7.1695 | −7.1669 |
| 7 | 7.1724 | −7.1686 |
| 8 | 7.1707 | −7.1715 |
| 9 | 7.1690 | −7.1697 |
| 10 | Movement to 7.1713 Column 11 | −7.1680 ← movement from Column 10 to Column 9 |
| 11 | 7.1673 | −7.1703 |
| 12 | 7.1730 | −7.1663 |
| 13 | 7.1690 | −7.1720 |
| 14 | 7.1695 | −7.1680 |
| 15 | 7.1678 | −7.1686 |
| 16 | 7.1650 | −7.1669 |
| 17 | 7.1690 | −7.1640 |
| 18 | 7.1730 | −7.1680 |
| 19 | 7.1707 | −7.1720 |
| 20 | 7.1673 | −7.1697 |
| 21 | 7.1707 | −7.1663 |
| 22 | 7.1696 | −7.1697 |
| 23 | 7.1713 | −7.1686 |
| 24 | 7.1713 | −7.1703 |
| 25 | 7.1695 | −7.1703 |
| 26 | 7.1718 | −7.1686 |
| 27 | 7.1690 | −7.1709 |
| 28 | 7.1672 | −7.1680 |
| 29 | 7.1707 | −7.1663 |
| 30 | 6.9378 | −7.1609 |
| 31 | 6.9082 | −6.9668 |
| 32 | 6.9112 | −6.9072 |
| 33 | 7.1632 | −6.8889 |
| 34 | 7.1724 | −7.1651 |
| 35 | 7.1684 | −7.1715 |
| 36 | 7.1724 | −7.1674 |
| 37 | 7.1707 | −7.1715 |
| 38 | 7.1707 | −7.1697 |
| 39 | 7.1695 | −7.1697 |
| 40 | 7.1684 | −7.1686 |
| 41 | 7.1741 | −7.1674 |
| 42 | 7.1678 | −7.1732 |
| 43 | 7.1713 | −7.1669 |
| 44 | 7.1621 | −7.1703 |
| 45 | 7.1684 | −7.1611 |
| 46 | 7.1707 | −7.1675 |
| 47 | 7.1707 | −7.1697 |
| 48 | 7.1690 | −7.1698 |
| 49 | 7.1701 | −7.1680 |
| 50 | 7.1718 | −7.1692 |
| 51 | 7.1684 | −7.1709 |
| 52 | 7.1724 | −7.1674 |
| 53 | 7.1678 | −7.1715 |
| 54 | 7.1724 | −7.1669 |
| 55 | 7.1701 | −7.1715 |
| 56 | 7.1701 | −7.1692 |
| 57 | 7.1684 | −7.1692 |
| 58 | 7.1690 | −7.1674 |
| 59 | 6.9089 | −7.2142 |
| 60 | 6.9107 | −6.9061 |
| 61 | 6.9107 | −6.9107 |
| 62 | 7.1638 | −6.8644 |
| 63 | 7.1724 | −7.1657 |
| 64 | 7.1661 | −7.1715 |
| 65 | 7.1741 | −7.1651 |
| 66 | 7.1701 | −7.1732 |
| 67 | 7.1701 | −7.1692 |
| 68 | 7.1695 | −7.1692 |
| 69 | 7.1707 | −7.1686 |
| 70 | 7.1713 | −7.1697 |
| 71 | 7.1701 | −7.1703 |
| 72 | 7.1701 | −7.1692 |
| 73 | 7.1632 | −7.1692 |
| 74 | 7.1696 | −7.1623 |
| 75 | 7.1655 | −7.1686 |
| 76 | 7.1736 | −7.1646 |
| 77 | 7.1690 | −7.1726 |
| 78 | 7.1707 | −7.1680 |
| 79 | 7.1690 | −7.1698 |
| 80 | 7.1718 | −7.1680 |
| 81 | 7.1718 | −7.1709 |
| 82 | 7.1684 | −7.1709 |
| 83 | 7.1724 | −7.1674 |
| 84 | 7.1678 | −7.1715 |
| 85 | 7.1724 | −7.1669 |
| 86 | 7.1667 | −7.1715 |
| 87 | 7.0537 | −7.1890 |
| 88 | 6.9103 | −7.0985 |
| 89 | 6.9112 | −6.9084 |
| 90 | 6.9061 | −6.9112 |

* * * * *